No. 826,647. PATENTED JULY 24, 1906.
P. BRUNO.
DEVICE FOR SECURING AND SEALING DOORS, &c.
APPLICATION FILED DEC. 3, 1904.
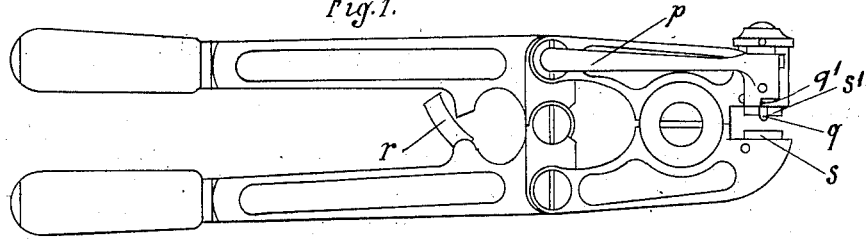
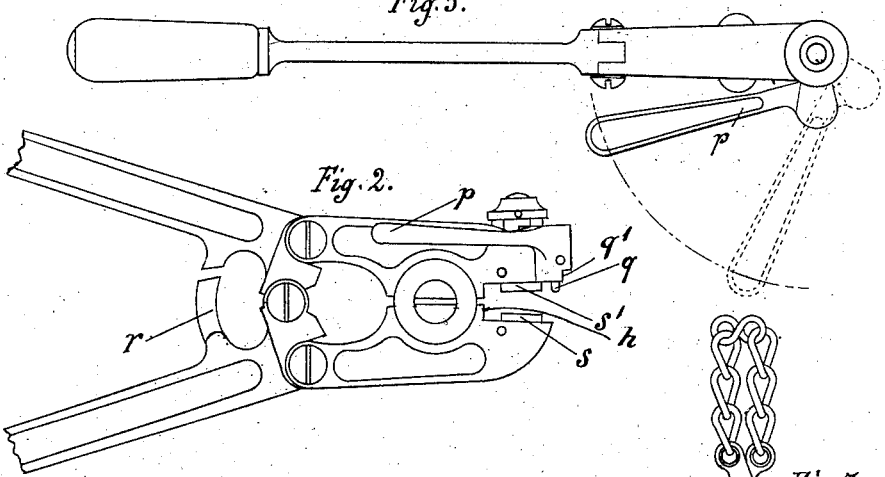
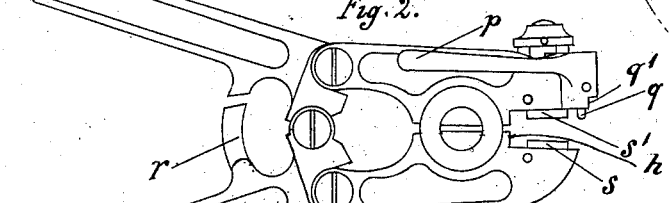
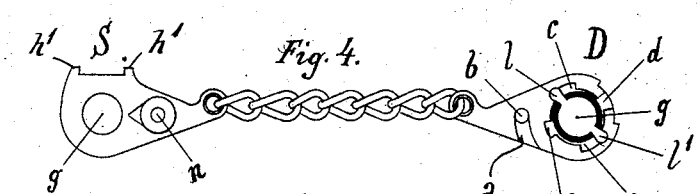
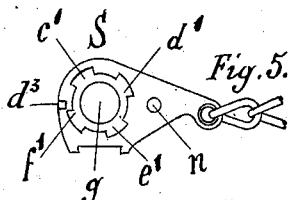
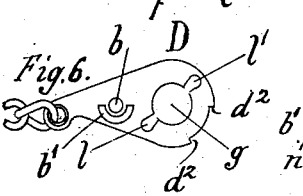
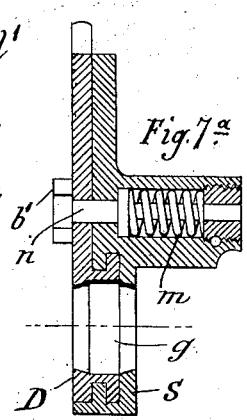
Witnesses.
Inventor
P. Bruno
By his Attorney.

UNITED STATES PATENT OFFICE.

PIETRO BRUNO, OF TURIN, ITALY.

DEVICE FOR SECURING AND SEALING DOORS, &c.

No. 826,647.   Specification of Letters Patent.   Patented July 24, 1906.

Application filed December 3, 1904. Serial No. 235,311.

*To all whom it may concern:*

Be it known that I, PIETRO BRUNO, a subject of the King of Italy, residing at Turin, Italy, have invented certain new and useful Improvements in Devices for Securing and Sealing Doors and the Like, of which the following is a specification.

This invention relates to devices for securing doors and the like—for instance, the doors of baggage-cars—by means of an attachment comprising two members connected with each other by means of a chain, the said members being of such construction that they can be fixed to each other by means of a leaden seal with the aid of a special punch, which is the subject of a separate application for patent, filed December 2, 1905, Serial No. 290,016, and that when the said parts have been fixed to each other the same punch or an exactly similar one must be used in order to separate them without destroying special marks on the leaden seal.

In the annexed drawings, Figure 1 is a side view of the punch by means of which the seal is formed, the punch being shown in its closed condition. Fig. 2 represents the said punch in its open position. Fig. 3 represents a detail of the punch. Fig. 4 represents the attachment or fastening device, and Figs. 5 and 6 are separate views of the two members of said attachment seen from the other side. Fig. 7 represents the attachment with its two members connected to each other. Fig. 7$^a$ is a detail view in section, on a larger scale, of the two members. Fig. 8 represents a leaden seal before its insertion into the attachment, and Fig. 9 represents the said seal after it has been acted on by the punch.

As shown in Fig. 4, the attachment comprises the two members D and S, which are fastened to the ends of the chain, by means of which the two parts to be held in connection with each other—for instance, a door and its frame—are connected or fastened together. Each of the members D and S is provided at its center with an aperture $g$ in the form of a truncated cone, the major diameters of the two apertures being at those sides of the said members which are to be brought into contact with each other. The major circumference of the hole in the member D is surrounded by teeth $c\,d\,e\,f$, the corresponding circumference in the member S being surrounded by recesses $c'\,d'\,e'\,f'$, with which the said teeth are adapted to engage in the manner of a bayonet-fastening when placed therein and given a partial turn. The member D, Fig. 4, is provided with a curved groove $a$, which terminates in a small hole $b$ for the reception of a pin $n$, projecting from the member S, the said pin being acted on by a helical spring $m$, so that when the members D and S are engaged together the pin $n$ engages in the hole $b$ and prevents the relative movement of the members D and S. Near the hole $b$ is a lug $b'$, Fig. 6, for a purpose hereinafter described. Part of the edge of member D is cut away to leave two shoulders $d^2\,d^2$, between which the projection $d^3$ on member S has a limited movement. On one edge of member S two lugs $h'\,h'$ are provided to engage shoulders $h$ on the punch to prevent the member S from revolving when the seal is to be removed.

As shown in Figs. 4 and 6, two recesses $l$ and $l'$, diametrically opposite each other, are provided at the circumference of the aperture $g$ in the member D to receive lugs on the seal. The jaws of the punch (shown in Figs. 1 and 2) are indicated by $s$ and $s'$. When the seal is to be punched, the abutment $r$ is placed in the position shown in Fig. 1. When the chain has been passed through suitable staples or the like fixed to the parts to be fastened together, the members S and D are placed together in such a manner that the surface of the member S (shown in Fig. 5) is placed against the surface of the member D. (Shown in Fig. 4.) The teeth $c$, $d$, $e$, and $f$ on member D thus enter the recesses $c'$, $d'$, $e'$, and $f'$ on member S, whereupon the two members are rotated with regard to each other to engage the teeth in the recesses. The pin $n$ slides in the groove $a$ until it reaches the hole $b$, into which it is pressed by the spring $m$. The members S and D are by this means connected with each other in such a manner that they cannot easily be separated, since in order to do so it is necessary to push the pin $n$ out of the hole $b$. The seal, (shown in Fig. 8,) which is provided with two radial projections of lugs, is thereupon inserted, through the member D into the apertures $g$, its lugs entering the recesses $l\,l'$. The device is then placed between the jaws of the punch, the shoulders $h$ of the latter lying between the lugs $h'\,h'$, and considerable pressure is then exerted on the said seal by means of the jaws $s$ and $s'$ of the punch, the surfaces of the said jaws being provided with type adapted to impress on the seal the marks of reference or identification desired. When this has been done, it is impossible to separate the members S and D without injuring the impression on the seal unless the same or a similar punch is used for that purpose, and an injured seal cannot, of course, be replaced without the aid of the said punch. The apertures $g$ in the members S and D allow of ascertaining at any moment whether the seal is uninjured. For separating the members S and D the device is placed in the punch as before, and the jaws $s$ and $s'$ of the punch are placed in contact with the surfaces of the seal, the lever $p$ being placed in such a position that the pin $q$ thereon enters the hole $b$ and pushes the pin $n$ out of the latter. The lever $p$ is then swung so that its shoulder $q'$, bearing against the lug $b'$, causes the member D to rotate. The seal being held in position by the jaws $s$ and $s'$, the lugs fixed to the said seal are by this means sheared off, and the members S and D, having been disengaged from each other, can be separated, allowing the seal to fall out.

I claim—

1. A device for securing doors and the like comprising in combination two juxtaposed members provided with coinciding apertures, one of said members being provided with recesses, a flexible connection between said two members, teeth on the other member adapted to enter said recesses, means for limiting the relative displacement of the two members, and a seal adapted to be inserted in the aforesaid coinciding apertures, and to be compressed therein, substantially as described.

2. A device for securing doors and the like comprising in combination two juxtaposed members provided with coinciding apertures, one of said members having recesses round the circumference of its aperture and the other member radial recesses communicating with its aperture, a flexible connection between said two members, teeth on the second-named member adapted to enter the aforesaid circumferential recesses, means for limiting the relative displacement of said two members, a seal adapted to be inserted in said coinciding apertures and to be compressed therein, and lugs on said seal for engaging the radial recesses aforesaid, substantially as described.

3. A device for securing doors and the like comprising in combination two juxtaposed members provided with coinciding truncated conical apertures, one of said members having recesses round the circumference of its aperture and the other member diametral recesses communicating with its aperture, a flexible connection between said two members, teeth on the second-named member adapted to enter the aforesaid circumferential recesses, a spring-pressed pin on one member adapted to engage the other member for limiting the relative displacement of the two members, a seal adapted to be inserted in said coinciding apertures, and lugs on said seal for engaging the diametral recesses aforesaid, substantially as described.

In witness whereof I have signed this specification in the presence of two witnesses.

PIETRO BRUNO.

Witnesses:
   GOTTARDO C. PIRONI. [L. S.]
   SECONDO TORTA. [L. S.]